United States Patent [19]
Itakura et al.

[11] Patent Number: 4,961,404
[45] Date of Patent: Oct. 9, 1990

[54] INTERNAL COMBUSTION ENGINE WITH WATER-COOLING INTERCOOLER

[75] Inventors: Masato Itakura, Toyota; Yoshinari Takakura, Anjo; Toshio Tanahashi, Susono, all of Japan

[73] Assignees: Aisin Seiki Kabushiki Kaisha, Kariya; Toyota Jidosha Kabushiki Kaisha, Toyota, both of Japan

[21] Appl. No.: 481,246

[22] Filed: Feb. 20, 1990

[30] Foreign Application Priority Data

Feb. 17, 1989 [JP] Japan .................................. 64-36019
Jul. 25, 1989 [JP] Japan ............................. 64-86491[U]
Aug. 11, 1989 [JP] Japan ................................ 64-206687

[51] Int. Cl.⁵ ............................................. F01P 1/06
[52] U.S. Cl. .............................. 123/41.31; 123/41.29; 123/41.44; 123/563; 417/423.5
[58] Field of Search ............... 123/41.31, 41.44, 41.47, 123/41.29, 563; 415/12, 145, 158.1, 174.2; 416/181; 417/423.5, 423.14, 427

[56] References Cited

U.S. PATENT DOCUMENTS 3,442,258  5/1969  Rüger et al. ...................... 123/41.31

FOREIGN PATENT DOCUMENTS 58-27810   2/1983  Japan .
59-138717  8/1984  Japan .
59-142493  9/1984  Japan .
60-78929   6/1985  Japan .
61-179327  11/1986 Japan .
62-45336   3/1987  Japan .
62-64899   4/1987  Japan .

Primary Examiner—Noah P. Kamen
Attorney, Agent, or Firm—Oblon, Spivak, McClelland, Maier & Neustadt

[57] ABSTRACT

A cooling system for an internal combustion engine with an intercooler has a pump with a single drive shaft which drives two sets of vanes. One set of vanes circulates coolant through a circuit including the engine block, and the other circulates fluid through a circuit including the intercooler. Around the rotary impeller of the pump is a clearance to allow communication between the circuits. Thus, the intercooler can function as an intake air heater when cold-starting the engine, idling without supercharging, or operating the engine in the region of low engine rpm's.

10 Claims, 11 Drawing Sheets

INTERNAL COMBUSTION ENGINE WITH WATER-COOLING INTERCOOLER

BACKGROUND OF THE INVENTION

1. Field of the Invention

This invention relates to an internal combustion engine with a water-cooling intercooler.

2. Description of the Prior Art

A representative example of a water-cooling intercooler of a cooling system which has been proposed so far is shown in FIGS. 13 and 14. FIG. 13 shows a system diagram of the flow of cooling water for cooling an intercooler 50. The cooling water for cooling the intercooler 50 flows in a cooling system disposed independently of an engine cooling system (not shown), and is circulated between the intercooler 50 and a sub-radiator 53 by an electric water pump 52 provided exclusively for the intercooler 50. The cooling water got through the heat-exchange in the intercooler 50 is delivered to the sub-radiator 53 disposed at the front of a vehicle, and is cooled by an engine cooling fan (not shown) and by the wind resulting from the travelling vehicle. The cooling water thus cooled is again introduced into the intercooler 50. In FIG. 13, an air cleaner is designated at 54, a turbocharger is designated at 55, and a surge tank is designated at 56.

Turning now to FIG. 14, the figure shows a tandem type centrifugal water pump 57 proposed in Japanese Unexamined Patent Publication No. 27810/1983. The water pump 57 has a housing 59 rotatably holding a rotary impeller 58. The rotary impeller 58 is fixed on a drive shaft 61 with a pulley 60 installed at one end thereof. The rotary impeller 58 forms a first fluid chamber 63 and a second fluid chamber 64 together with an inner partition member 62 formed integrally in the housing 59, and has first vanes 67 formed integrally thereon for the first fluid chamber 63 and second vanes 68 formed integrally thereon for the second fluid chamber 64. The first fluid chamber 63 is connected to a water jacket of an engine, an inlet port (not shown) and an outlet port (not shown). The second fluid chamber 64 is communicated with an air-fluid heat exchanger, and is connected to the other inlet port (not shown) and an outlet port 65. A sealing member 66 is placed between the inner partition member 62 and the rotary impeller 58 which separates the first fluid chamber 63 and the second fluid chamber 64 independently of each other.

The two cooling water circuits for the engine and the water-cooling intercooler 50 shown in FIG. 13 do not communicate with each other, and the cooling water temperatures thereof are controlled independently. Consequently, when cold-starting the engine, the intake air should be heated by a certain method, i.e., employing an electric heater or utilizing the heat of the exhaust gas, in order to avoid icing at the throttle of the throttle valve and facilitate the vaporization of the gasoline.

Further, the centrifugal water pump 57 shown in FIG. 14 delivers the cooling water for the intercooler and the engine with the first vanes 67 and the second vanes 68 of the rotary impeller 58 provided on the single drive shaft 61. According to the description of Japanese Unexamined Patent Publication No. 27810/1983, a separator wall 69 of the rotary impeller 58 for holding the sealing member 66 is adjusted with the partition member 62 so as to substantially shut off the cooling water flow between the first fluid chamber 63 and the second fluid chamber 64. Therefore, the two cooling water circuits are also disposed independently of each other in the centrifugal water pump 57 shown in FIG. 14 as described in the cooling system shown in FIG. 13, and the intake air should also be heated by a certain method when cold-starting the engine.

SUMMARY OF THE INVENTION

In the prior art, the intercooler has been an intake air cooler for an engine with a turbocharger, and operates to cool the intake air as follows. When air is compressed by the turbocharger, the temperature of the intake air is increased by the adiabatic compression. When the temperature of the intake air is increased more than necessary, the intake air expands thermally to adversely affect the charging efficiency of the engine, namely to reduce the weight of the intake air, thereby making the knocking more likely to happen and deteriorating the engine output. Accordingly, the intercooler has been provided in order to decrease the temperature of the intake air after the compression by turbocharger in the prior art. The intercooler thus further increases the engine output. However, when cold-starting the engine or operating the engine in the region of low engine rpm's, the intercooler is substantially a redundant component member in the prior art.

Hence, the inventors of this invention have come to think of further utilizing the intercooler, and come to contemplate to use the intercooler as an intake air heater by utilizing and allowing the cooling water of higher temperature and larger volume flowing in the engine cooling circuit to flow in the intercooler cooling circuit under the above-mentioned situation. Therefore, it is a primary object of this invention to provide an internal combustion engine with a water-cooling intercooler, wherein the cooling water is exchanged between the engine cooling circuit and the intercooler cooling circuit in a tandem type water pump where the two circuits are adjacent to each other. In this invention, the intercooler can be made to operate as an intake air heater when cold-starting the engine or operating the engine in the region of low engine rpm's, thereby optimizing the combustion state of the internal combustion engine and reducing the number of cooling water reservoir tanks and the like to one for the entire cooling system.

The above and other objects are achieved by an internal combustion engine with a water-cooling intercooler according to this invention comprising: a first fluid circuit comprising: a radiator for cooling an engine; a first bypath conduit; and a first thermostat; a second fluid circuit comprising: a sub-radiator for cooling a water-cooling intercooler; a second bypath conduit; and a second thermostat; and a water pump comprising: a drive shaft driven by the engine and a rotary impeller fixed at an end of the drive shaft and comprising first vanes for delivering fluid in the first fluid circuit and second vanes of capacity smaller than the capacity of the first vanes for delivering fluid in the second fluid circuit; wherein the water pump has a clearance of labyrinth structure between the rotary impeller and a partition plate disposed around outer periphery of the rotary impeller and dividing a water pump body into a first volute chamber for delivering fluid in the first fluid circuit and a second volute chamber for delivering fluid in the second fluid circuit.

The internal combustion engine with the water-cooling intercooler according to this invention may further comprise at least one communication bore formed in the partition plate which divides the first volute chamber and second volute chamber, and the communication bore may be opened or closed by at least one thermo-sensitive member detecting the temperature of fluid on the first fluid circuit side.

In addition, the internal combustion engine with the water-cooling intercooler according to this invention may further comprise a communication conduit for communicating the following two conduits; a conduit connecting an engine outlet port of the first fluid circuit with a radiator inlet port of the first fluid circuit; and a conduit connecting a water pump outlet port of the second fluid circuit with an intercooler inlet port of the second fluid circuit; and the communication conduit may further comprise a flow control means. The flow control means may be an orifice; or a thermo-sensitive member detecting the temperature of fluid for opening and closing the communication conduit; or an opening-closing valve for opening and closing the communication conduit in accordance with signals output by a fluid temperature sensor for detecting the temperature of fluid on the second fluid circuit side.

The internal combustion engine with the water-cooling intercooler according to this invention operates as follows. A predetermined amount of fluid is exchanged between the first fluid circuit and the second fluid circuit through the clearance of labyrinth structure because of the capacity difference between the first vanes and the second vanes which are formed on both sides of the rotary impeller, namely because of the head difference. The fluid exchange amount or the fluid leakage amount through the clearance of labyrinth structure shows the following characteristic: the fluid leakage amount is substantially proportional to the number of engine revolutions in the region of low engine rpm's and saturates in the region of intermediate and high engine rpm's. Here, taking this fluid leakage amount characteristic and the fact that the fluid temperature of the first fluid circuit for cooling the engine is higher than that of the second fluid circuit for cooling the water-cooling intercooler, and the fact that the flow amount of the second fluid circuit is in proportion to the number of engine revolutions into consideration, the following are readily understood. Namely, the flow amount of the fluid cooled to low temperatures by the sub-radiator and flowing in the second fluid circuit is equal to the fluid leakage amount, i.e., the fluid of high temperatures flowing from the first fluid circuit, in the region of low engine rpm's, and the temperature of the fluid flowing in the second fluid circuit is accordingly increased in the region of low engine rpm's. On the contrary, since the flow amount of the fluid cooled by the sub-radiator and flowing in the second fluid circuit is greater than the fluid leakage amount in the region of intermediate and high engine rpm's, the temperature of the fluid flowing in the second circuit is accordingly decreased in the region of intermediate and high engine rpm's. Hence, the intercooler works as an intake air heater when cold-starting the engine, idling without supercharging, or operating the engine in the region of low engine rpm's.

The internal combustion engine with the water-cooling intercooler according to this invention is arranged as described in detail so far. In the region of low engine rpm's, the temperature of the fluid flowing in the second fluid circuit increases because the fluid leakage amount, i.e., the fluid of high temperatures flowing from the first fluid circuit, is equal to the flow amount of the fluid cooled to low temperatures by the sub-radiator and flowing in the second fluid circuit. Accordingly, the combustion state of the combustion engine can be made optimum, because the intake air is heated exclusively in the region of low engine rpm's. On the other hand, in the region of intermediate and high engine rpm's, the temperature of the fluid flowing in the second circuit decreases, because the flow amount of the fluid cooled by the sub-radiator and flowing in the second fluid circuit is greater than the fluid leakage amount.

As a result, the internal combustion engine with the water-cooling intercooler according to this invention can perform the heating of intake air without employing special apparatuses and methods, for instance the conventional electric heater and the utilization of exhaust gas heat for heating the intake air. Therefore, this invention can get rid of extra spaces, conventionally required for the apparatuses such as the electric heater, and control apparatuses for turning on and off the intake air heating intermittently.

In this invention, since the first fluid circuit for cooling the engine and the second fluid circuit for cooling the intercooler communicate with each other by way of the clearance of labyrinth structure, the number of the reservoir tanks can be reduced. That is, in the case of the prior art in which the first fluid circuit for cooling the engine and the second fluid circuit for cooling the intercooler are disposed independently of each other, the second fluid circuit also requires a reservoir tank for separating the gas and the cooling water and supplying the cooling water and a cap for replenishing the cooling water and adjusting the circuit pressure. This invention does not require such component parts for the second fluid circuit for cooling the intercooler. The prior art requires a reservoir tank and a cap for the first and second fluid circuit, respectively, namely two reservoir tanks and two caps in total for the entire system. However, this invention requires one reservoir tank and one cap, because the first fluid circuit and the second fluid circuit are communicating with each other and the first fluid circuit for cooling the engine is usually equipped with a reservoior tank and a cap for the purposes.

Further, the internal combustion engine with the water-cooling intercooler according to this invention may have the above-mentioned partition plate or the portion thereof forming the above-mentioned labyrinth structure which is made of a material having a thermal conductivity coefficient lower than the thermal conductivity coefficient of aluminum and being less likely to corrode. In addition, the rotary impeller may also be made of a material being less likely to corrode.

When employing the thus arranged partition plate or the portion thereof forming the labyrinth structure, it is possible to minimize the thermal flow from the first volute chamber of the first fluid circuit for cooling the engine to the second volute chamber of the second fluid circuit for cooling the intercooler. In addition, when the partition plate and the rotary impeller are made of materials being less likely to corrode, it is possible to make the clearance of labyrinth structure less susceptible to corrosion and make the dimension thereof unchangeable. As a result, the temperature of the intercooler cooling water can be kept low in the region of intermediate and high engine rpm's, because the thermal flow from the first fluid circuit to the second fluid circuit has been minimized. Additionally, there is no fear for problems impairing the performance of the cooling system, because the partition plate and the rotary impeller are made of materials being less likely to corrode in order to make the clearance of labyrinth structure less susceptible to corrosion and make the dimension thereof unchangeable.

Furthermore, the thermal expansion coefficient of the material forming the rotary impeller may be set greater than the thermal expansion coefficient of the material forming the partition plate, thereby reducing the fluid leakage amount from the first fluid circuit for cooling the engine to the second fluid circuit for cooling the intercooler. If such is the case, the clearance of labyrinth structure becomes greater to allow greater fluid leakage amount when the fluid temperature of the first fluid circuit is low. When the fluid temperature of the first fluid circuit is high, the clearance thereof becomes smaller to allow less fluid leakage amount, because the rotary impeller expands to enlarge the outer diameter thereof, and reduces the dimension of the clearance of labyrinth structure.

When employing such materials for the partition plate and the rotary impeller, the clearance of labyrinth structure is large enough to allow large fluid leakage amount if the fluid temperature of the first fluid circuit for cooling the engine is low, and the rotary impeller thermally expands to reduce the dimension of the clearance thereof if the fluid temperature of the first fluid circuit is high, thereby reducing the fluid leakage amount. As a result, it is possible to stabilize the performance of the cooling system and the function of the cooling system as an intercooler in the region of intermediate and high engine rpm's. Additionally, this arrangement is extremely simple so that there will be no fear for failures.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Having generally described this invention, a further understanding can be obtained by reference to certain specific preferred embodiments which are provided herein for purposes of illustration only and are not intended to be limiting unless otherwise specified.

First Preferred Embodiment

Figure 1:
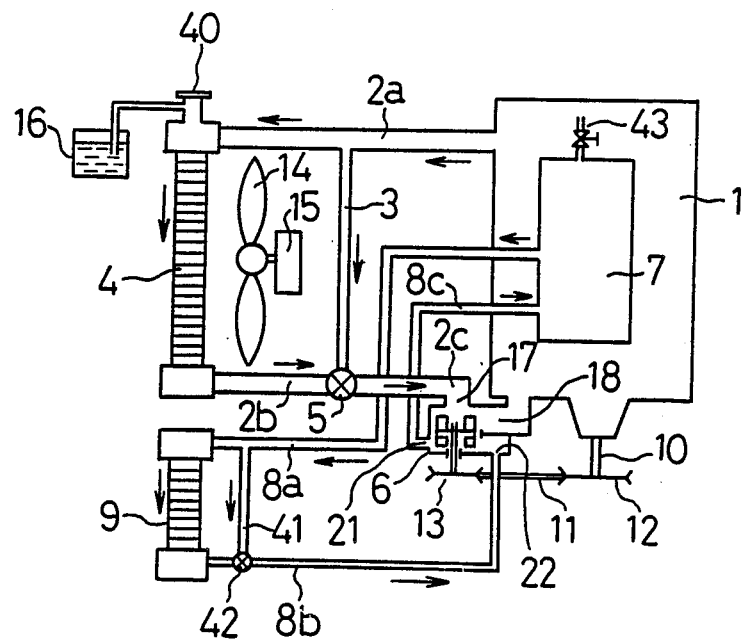
FIG. 1 is a fluid circuit diagram on a first preferred embodiment of an internal combustion engine with a water-cooling intercooler according to this invention.
Figure 2:
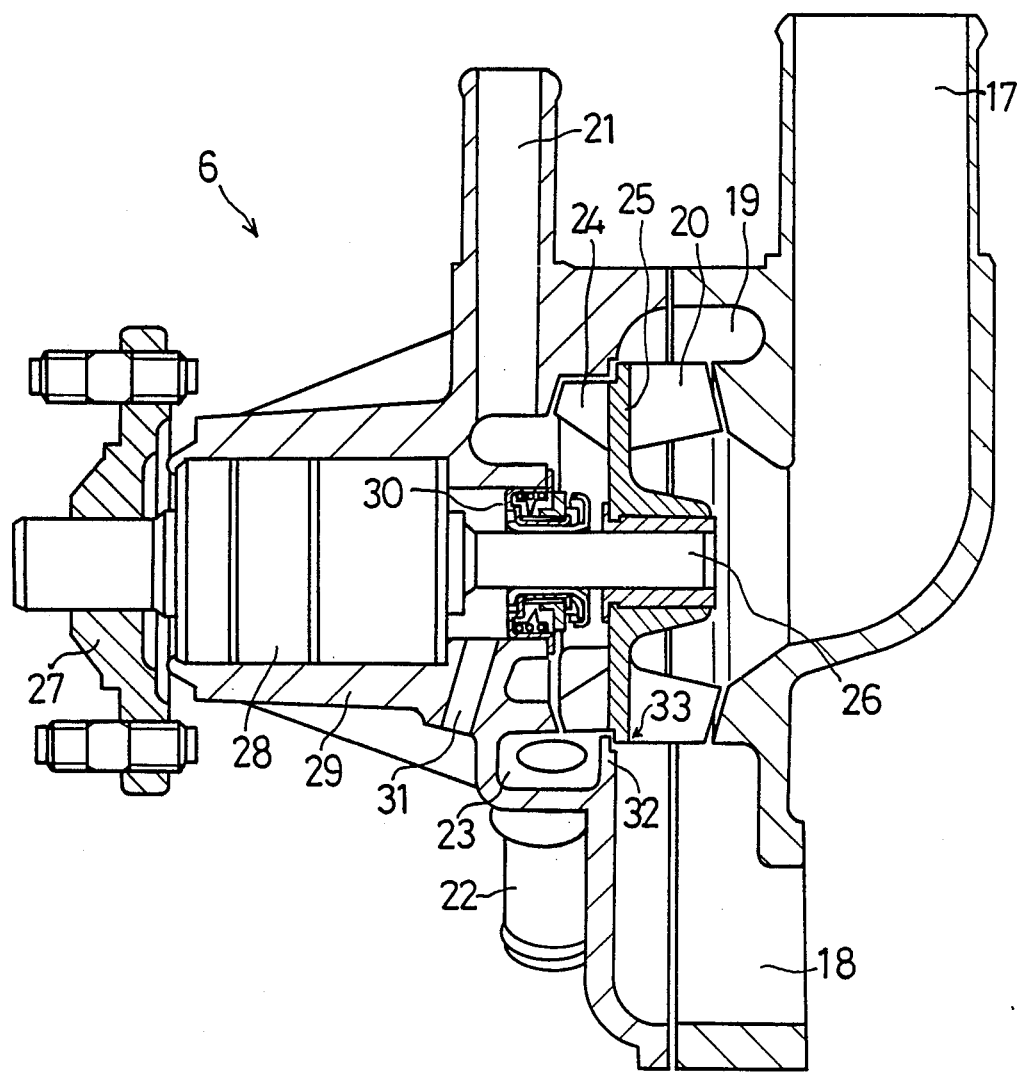
FIG. 2 is an enlarged cross-sectional view on a water pump of the first preferred embodiment thereof.
Figure 3:
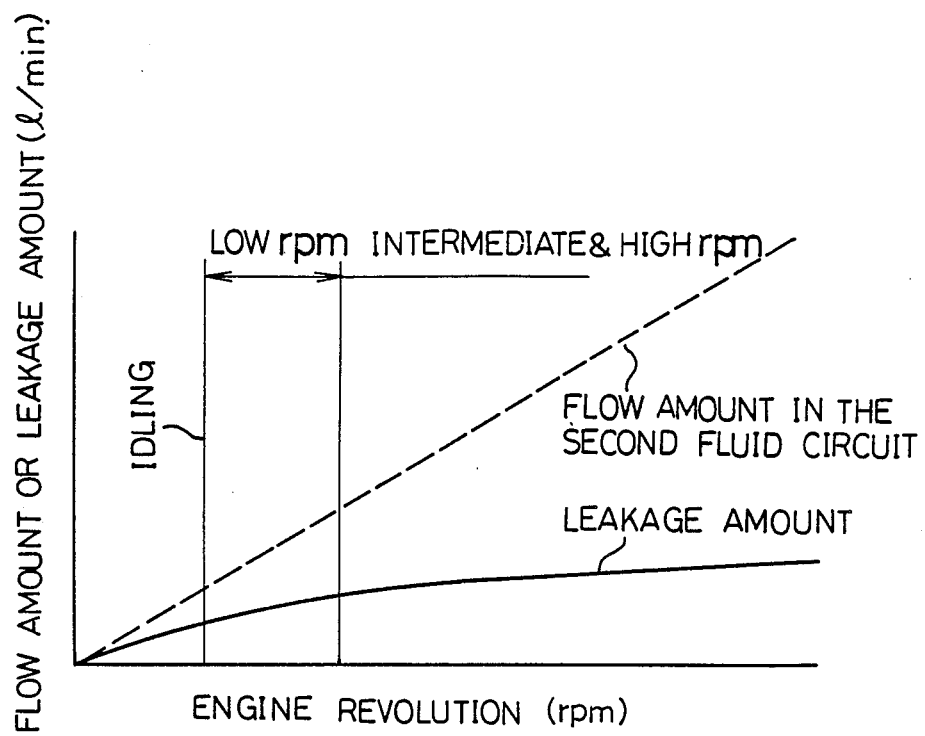
FIG. 3 is a flow amount characteristic curve of the first preferred embodiment thereof.

A first preferred embodiment of an internal combustion engine with a water-cooling intercooler according to this invention will be hereinafter described, and is illustrated in FIGS. 1, 2 and 3. FIG. 1 is a fluid circuit diagram on the first preferred embodiment thereof. As illustrated in FIG. 1, the fluid circuit comprises a first fluid circuit and a second fluid circuit. The first fluid circuit is for cooling an engine 1, and comprises conduits 2a, 2b and 2c, a first bypass conduit 3, a radiator 4, a first thermostat 5, and a water pump 6. A second fluid circuit is for cooling an intercooler designated at 7, and comprises conduits 8a, 8b and 8c, a second bypass conduit 41, a sub-radiator 9, a second thermostat 42, and the water pump 6.

The water pump 6 is driven and rotated by a crank shaft 10 of the engine 1 by way of a pulley 12, a belt 11 and a pulley 13. A cooling fan is designated at 14, works to cool the radiator 4, and is driven by a driving apparatus 15. A reservoir tank equipped on the radiator 4 is designated at 16, and works to separate the gas and the cooling water and to receive and compensate the cooling water when the cooling water drainage occurs. A cap is designated at 40, and is for replenishing the cooling water and adjusting the circuit pressure. An air vent valve is designated at 43, and is for purging the air from the second fluid circuit for cooling the intercooler 7.

As illustrated in FIG. 2 a first water delivery portion for the first fluid circuit comprises a first water inlet port 17 connected to the conduit 2c, a first water outlet port 18 for delivering the cooling water to the engine 1, a first volute chamber 19, and first vanes 20.

As also illustrated in FIG. 2, a second water delivery portion for the second fluid circuit comprises a second water outlet port 21 connected to the conduit 8c, a second water inlet port 22 to which the cooling water is supplied from the conduit 8b, a second volute chamber 23, and second vanes 24.

A plurality of first vanes 20 and a plurality of second vanes 24 are provided respectively on one of the sides of one rotary impeller 25. The cooling water delivery capacity (hereinafter abbreviated to "capacity") of the first vanes 20 is set greater than the capacity of the second vanes 24. A drive shaft is designated at 26, and driven and rotated by the crank shaft 10 by way of a pulley seat 27. The drive shaft 26 drives and rotates the rotary impeller 25 press-fitted at the end thereof, and the first vanes 20 and the second vanes 24 rotate. The drive shaft 26 is assembled integrally with a bearing 28 press-fitted into a body 29. A mechanical seal is designated at 30, and is for preventing the cooling water from intruding . into the bearing 28. A water vent hole is designated at 31, and is formed in the body 29.

The first volute chamber 19 and the second volute chamber 23 are divided by a partition plate 32 formed integrally with the body 29, and the partition plate 32 is disposed so that it forms a surface being substantially flush with the rotary impeller 25. Further, the partition plate 32 and the outer periphery of the rotary impeller 25 form a labyrinth portion clearance 33 between themselves.

The operation of the thus arranged first preferred embodiment of an internal combustion engine with a water-cooling intercooler according this invention will be hereinafter described. As illustrated in FIG. 2, the first volute chamber 19 and the second volute chamber 23, namely the first fluid circuit and the second fluid circuit, substantially communicate with each other through the labyrinth portion 33. When the engine 1 operates, a predetermined amount of the cooling water is exchanged between the first fluid circuit and the second fluid circuit through the labyrinth portion 33 because of the pump capacity difference of the first vanes 20 and the second vanes 24 formed respectively on one of the sides of the rotary impeller 25, namely because of the head difference. As shown with a solid line in FIG. 3, the cooling water leakage amount through the labyrinth portion 33 is substantially in proportion to the number of engine revolutions in the region of low engine rpm's, and saturates in the region of intermediate and high engine rpm's. This phenomenon results from the fact that a closed system is formed by the first fluid circuit and the second fluid circuit as a whole. That is to say, in the case that the two circuits are opened to the atmosphere and have sufficient volumes, the cooling water leakage amount is in proportion to the engine rpm's, because the head is in proportion to the square of the engine rpm's and because the cooling water leakage amount is in proportion to the root of the head. However, in the closed system like this first preferred embodiment, there is no room for admitting the cooling water leakage in an amount being proportional to the engine rpm's, the cooling water leakage amount accordingly saturates as shown with the solid line in FIG. 3. In FIG. 3, the line shown with a dotted line exhibits the flow amount in the second fluid circuit.

Here, when comparing the cooling water temperature of the first fluid circuit with that of the second fluid circuit, it is apparent that the cooling water temperature of the first fluid circuit for cooling the main heating body, i.e., the engine 1, .is higher than that of the second fluid circuit for cooling the intercooler 7.

Taking the above-mentioned fluid leakage amount characteristic and the fact that the fluid temperature of the first fluid circuit is higher than that of the second fluid circuit into consideration, it is readily understood that the following occur. Namely, the temperature of the fluid flowing in the second fluid circuit is increased in the region of low engine rpm's, because the flow amount of the cooling water of low temperatures cooled by the sub-radiator 9 and flowing in the second fluid circuit is equal to the cooling water leakage amount, i.e., the flow amount of the fluid of high temperatures flowing from the first fluid circuit in the region of low engine rpm's. On the contrary, the temperature of the cooling water flowing in the second circuit is decreased in the region of intermediate and high engine rpm's, because the flow amount of the cooling water cooled by the sub-radiator 9 and flowing in the second fluid circuit is larger than the cooling water leakage amount in the region of intermediate and high engine rpm's.

Again, taking the above-mentioned phenomena and the fact that the second fluid circuit is utilized to cool the intercooler 7, this first preferred embodiment of an internal combustion engine with a water-cooling intercooler according to this invention operates as follows. Namely, in spite of the fact that an intercooler has been known to operate to cool and increase the density of the intake air whose temperature is increased by the supercharging effect in the region of intermediate and high engine rpm's thereby increasing the engine output, the intercooler 7 is operated as an intake air heater when cold-starting the engine, idling without supercharging, or operating the engine in the region of low engine rpm's in this first preferred embodiment.

The heating of the intake air facilitates the gasification of the fuel when cold-starting the engine. Further, when employing a cold-start injector or a single point injector for supplying the fuel to the surge tank, the distribution of the air-fuel mixture can be improved by the intake air heating. In addition, a multi-point injector may be provided in order to homoginize the air-fuel mixture. The intake air heating has been done by utilizing the heat of exhaust gas or by an electric heater in the prior art. On the contrary, in this first preferred embodiment, the heating of the intake air can be done without adding special apparatuses. There is no fear for damaging the functions of the intercooler 7, because the cooling water flowing in the second circuit is cooled sufficiently in the region of high engine rpm's where the intercooler 7 is required to work as it is. Additionally, the bypath conduit 41 and the second thermostat 42 of the second fluid circuit work to further enhance the intake air heating effect of the first preferred embodiment.

Second Preferred Embodiment

Figure 4:
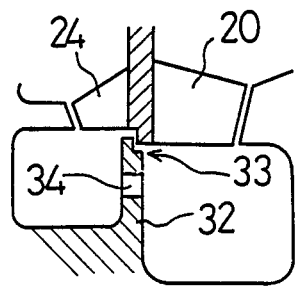
FIG. 4 is an enlarged cross-sectional view on the major portion of a water pump of a second preferred embodiment of an internal combustion engine with a water-cooling intercooler according to this invention.

A second preferred embodiment of an internal combustion engine with a water-cooling intercooler according to this invention will be hereinafter described, and is illustrated in FIG. 4. In the second preferred embodiment, a communication bore 34 for adjusting the cooling water leakage amount is formed in the partition plate 32. The effect of the intake air heating is further enhanced in this second preferred embodiment.

Third Preferred Embodiment

Figure 5:
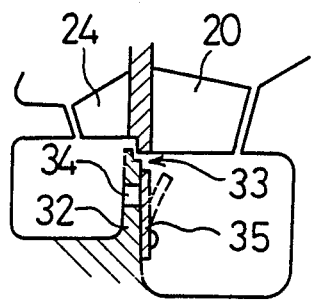
FIG. 5 is an enlarged cross-sectional view on the major portion of a water pump of a third preferred embodiment of an internal combustion engine with a water-cooling intercooler according to this invention.

As illustrated in FIG. 5 and can be understood therefrom, a third preferred embodiment of an internal combustion engine with a water-cooling intercooler according to this invention is a modification of the second preferred embodiment. In the third preferred embodiment, a thermo-sensitive member 35 comprising bimetal or shape memory alloy is disposed on the partition plate 32 on the side of the first volute chamber 19 in order to open and close the communication bore 34, thereby controlling the cooling water leakage amount. The effect of the intake air heating is furthermore enhanced in this third preferred embodiment.

Fourth Preferred Embodiment

Figure 6:
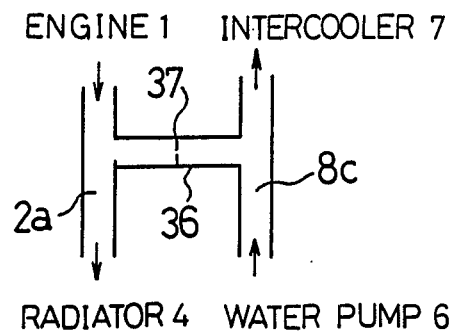
FIG. 6 is a fluid circuit diagram on the major portion of a fourth preferred embodiment of an internal combustion engine with a water-cooling intercooler according to this invention.

FIG. 6 illustrates a fourth preferred embodiment of an internal combustion engine with a water-cooling intercooler according to this invention. The fourth preferred embodiment has a communication conduit 36 connecting parts of the first fluid circuit and the second fluid circuit other than the labyrinth portion 33 around the rotary impeller 25 of the water pump 6, for instance the communication conduit 36 connects the conduit 2a of the first fluid circuit and the conduit 8c of the second fluid circuit. Further, the communication conduit 36 has an orifice 37 to adjust the cooling water leakage amount. The effect of the intake air heating can be improved in the region of low engine rpm's by employing the communication conduit 36 and the orifice 37.

Fifth Preferred Embodiment

Figure 7:
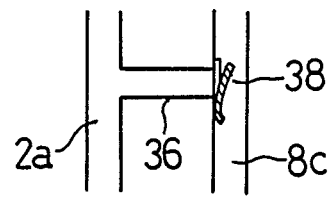
FIG. 7 is a fluid circuit diagram on the major portion of a fifth preferred embodiment of an internal combustion engine with a water-cooling intercooler according to this invention.

FIG. 7 illustrates a fifth preferred embodiment of an internal combustion engine with a water-cooling intercooler according to this invention. The fifth preferred embodiment has a thermo-sensitive member 38 for detecting the temperatures of the cooling water and opening and closing the communication conduit 36 instead of the orifice 37 of the fourth preferred embodiment. Other than the thermo-sensitive member 38, the fifth preferred embodiment has identical arrangements with those of the fourth preferred embodiment, and operates similarly to adjust the cooling water leakage amount and improve the effect of the intake air heating in the region of low engine rpm's.

Sixth Preferred Embodiment

Figure 8:
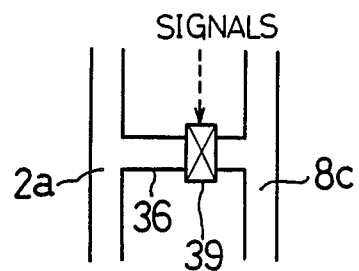
FIG. 8 is a fluid circuit diagram on the major portion of a sixth preferred embodiment of an internal combustion engine with a water-cooling intercooler according to this invention.

FIG. 8 illustrates a sixth preferred embodiment of an internal combustion engine with a water-cooling intercooler according to this invention. Instead of the thermo-sensitive member 38 of the fifth preferred embodiment, the sixth preferred embodiment has an electromagnetic valve 39 for opening and closing the communication conduit 36 in accordance with the signals output by a sensor (not shown) for detecting the engine operation conditions such as the cooling water temperatures, the engine rpm's and the like. The electromagnetic valve 39 may be a hydraulic valve or a pneumatic valve as far as it can open and close the communication conduit 36. Other than the electromagnetic valve 39, the sixth preferred embodiment has identical arrangements with those of the fourth preferred embodiment, and operates similarly to adjust the cooling water leakage amount and improve the effect of the intake air heating in the region of low engine rpm's.

Seventh Preferred Embodiment

A seventh preferred embodiment of an internal combustion engine with a water-cooling intercooler according to this invention is a modification of the first preferred embodiment. The modification hereinafter described in detail has been made for the purpose of minimizing the thermal flow from the first volute chamber 19 of the first fluid circuit to the second volute chamber 23 of the second fluid circuit and keeping the temperature of the cooling water in the second fluid circuit low in the region of intermediate and high engine rpm's.

Figure 9:
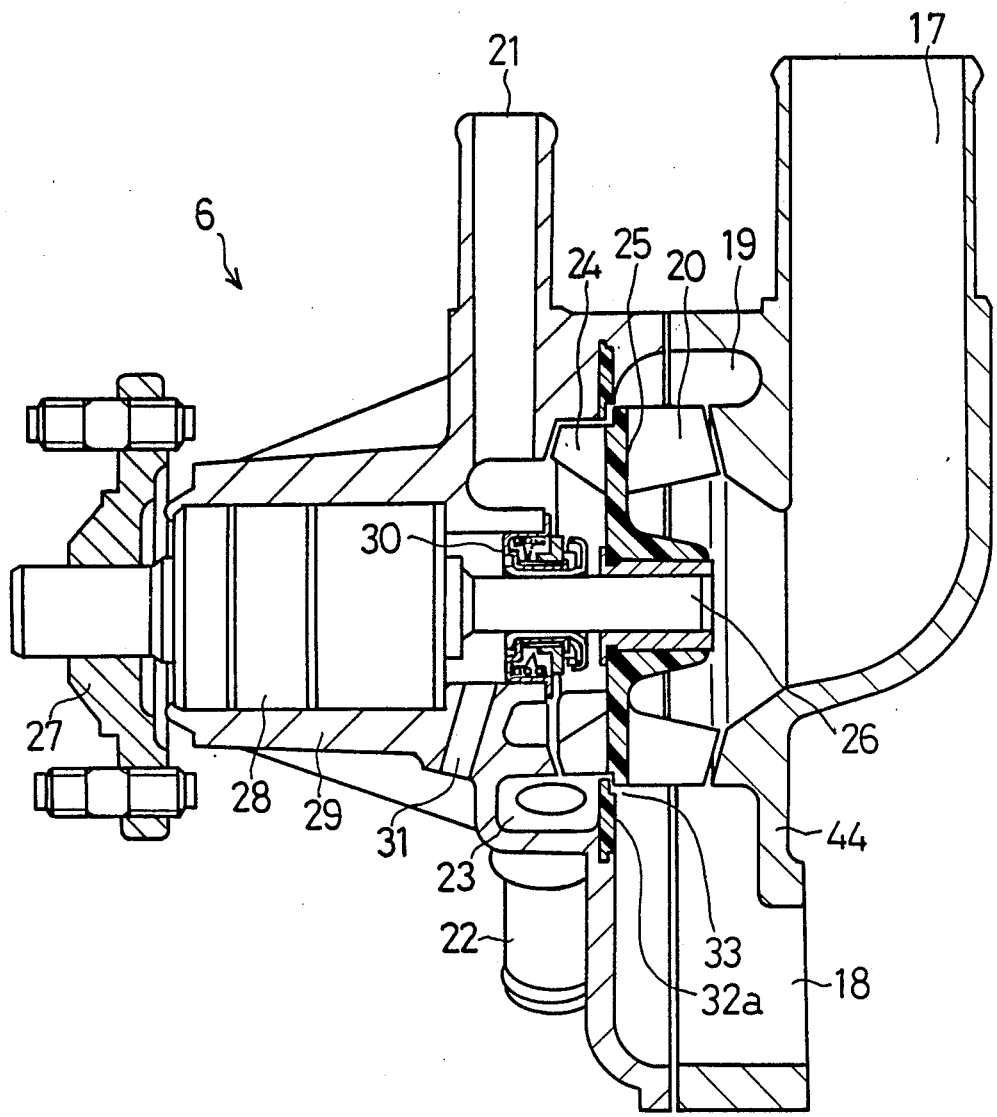
FIG. 9 is an enlarged cross-sectional view on a water pump of a seventh preferred embodiment of an internal combustion engine with a water-cooling intercooler according to this invention.

FIG. 9 illustrates the seventh preferred embodiment. One of the major features of the seventh preferred embodiment is the materials for forming a partition plate 32a and a rotary impeller 25, respectively. As illustrated in FIG. 9, the partition plate is designated at 32a, and made of a material different from the material for forming a body 29. The partition plate 32a is disposed around the outer periphery of the rotary impeller 25, and constitutes a labyrinth portion 33 together with the rotary impeller 25. The partition plate 32a is a component member made independently of the body 29, but inserted into and fixed in the body 29 integrally, thereby forming part of the wall surface of the first volute chamber 19 and the second volute chamber 23. The partition plate 32a is made of a material having a coefficient of thermal conductivity lower than that of aluminum and being less likely to corrode, for instance it is made of synthetic resin or stainless steel. The rotary impeller 25 is also made of a material being less likely to corrode, for instance it is made of glass filled polypropylene resin. Further, a cover is designated at 44, and made of aluminum in this seventh preferred embodiment. The thermal flow from the first volute chamber 19 to the second volute chamber 23 has been minimized and the temperature of the cooling water in the second fluid circuit has been kept low in the region of intermediate and high engine rpm's, because the partition plate 32a is made of the material having a coefficient of thermal conductivity being lower than aluminum. In addition, the labyrinth portion 33 will not be clogged, and the functions of the labyrinth portion 33 described in the above first preferred embodiment will not be deteriorated, because the partition plate 32a and the rotary impeller 25 are made of the materials being less likely to corrode.

Eighth Preferred Embodiment

An eighth preferred embodiment of an internal combustion engine with a water-cooling intercooler according to this invention is another modification of the first preferred embodiment. The modification has been made for the same purpose as described in the above seventh preferred embodiment.

Figure 10:
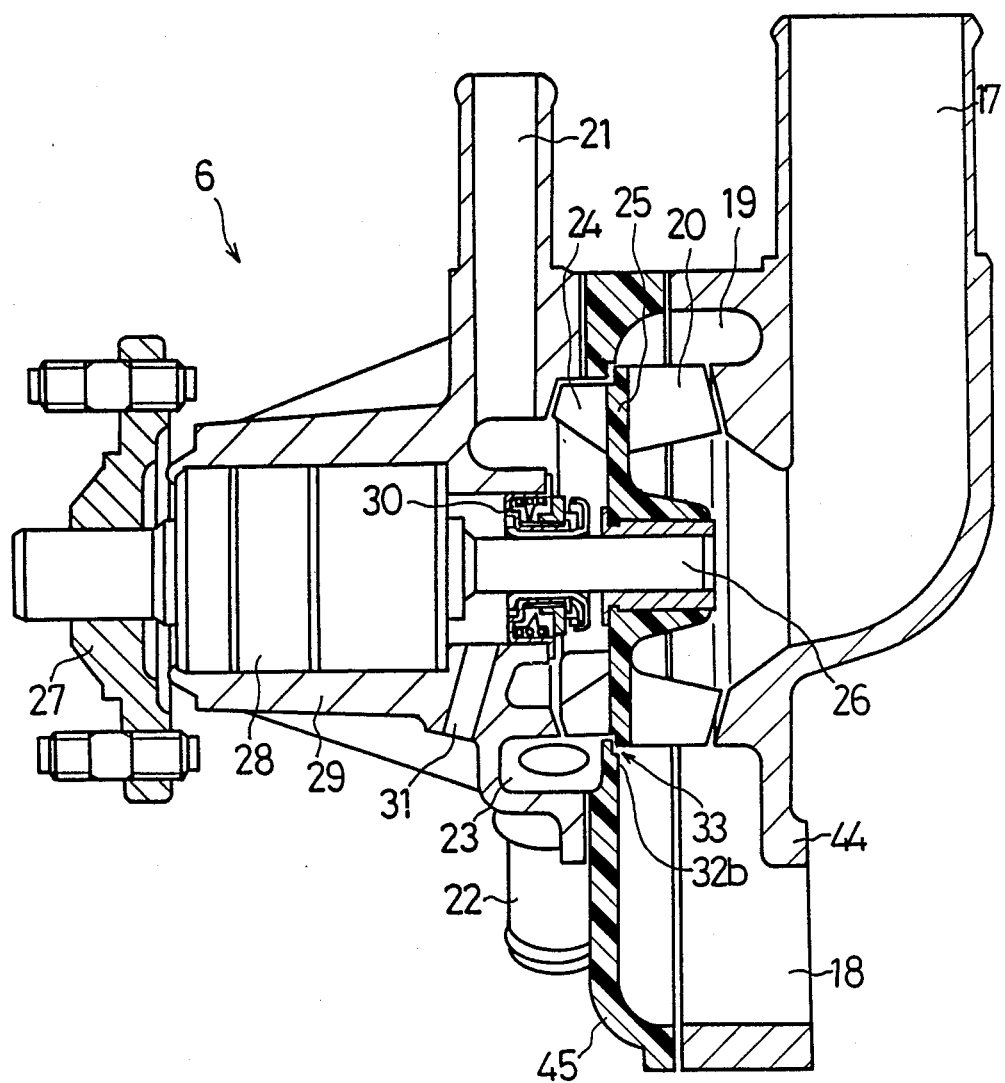
FIG. 10 is an enlarged cross-sectional view on a water pump of an eighth preferred embodiment of an internal combustion engine with a water-cooling intercooler according to this invention.

FIG. 10 illustrates the eighth preferred embodiment. In the eighth preferred embodiment, a second body 45 is provided independently of a body 29, and made of synthetic resin. The partition plate 32b is formed integrally with the second body 45. Also in this eighth preferred embodiment, a rotary impeller 25 is made of a material being less likely to corrode such as glass filled polypropylene resin. The eighth preferred embodiment thus arranged operates and takes effect similarly as described in the seventh preferred embodiment. Namely, the seventh preferred embodiment minimizes the thermal flow from the first volute chamber 19 to the second volute chamber 23, keeps the temperature of the cooling water in the second fluid circuit low in the region of intermediate and high engine rpm's, and maintains the functions of the labyrinth portion 33 for a long period of time.

Ninth Preferred Embodiment

A ninth preferred embodiment of an internal combustion engine with a water-cooling intercooler according to this invention is still another modification of the first preferred embodiment. The modification has been also made for the same purpose as described in the above seventh preferred embodiment.

Figure 11:
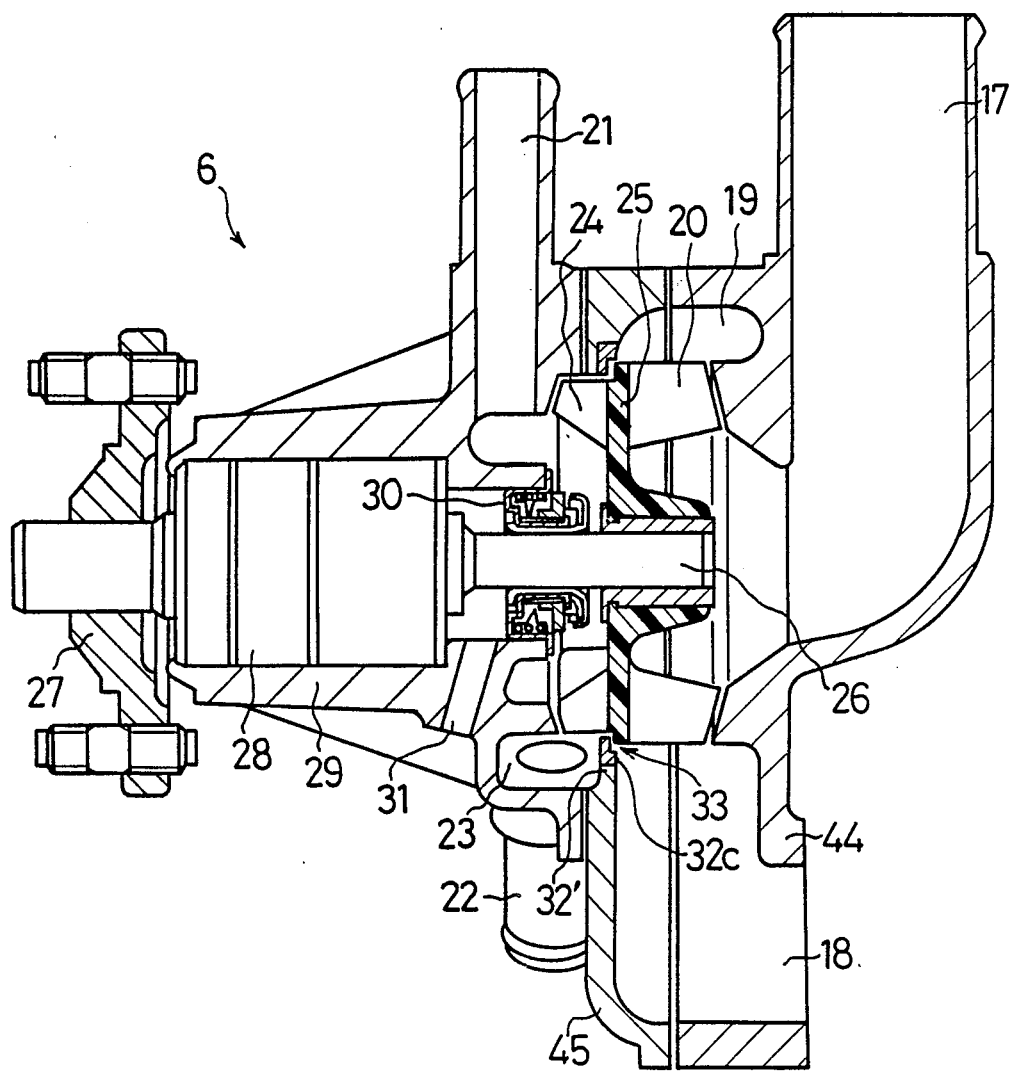
FIG. 11 is an enlarged cross-sectional view on a water pump of a ninth preferred embodiment of an internal combustion engine with a water-cooling intercooler according to this invention.

FIG. 11 illustrates the ninth preferred embodiment. In the ninth preferred embodiment, a second body 45 is provided independently of a body 29 similarly as described the eighth preferred embodiment. However, in this ninth preferred embodiment, the second body 45 is made of iron or synthetic resin, and only a labyrinth forming portion 32c thereof is made of a material, having a thermal conductivity coefficient lower than aluminum and being less likely to corrode, such as stainless steel. The labyrinth forming portion 32c is press-fitted into and fixed in the second body 45 integrally. Further, a rotary impeller 25 is also made of a material being less likely to corrode such as glass filled polypropylene resin. The operations and effects of the eighth preferred embodiment will not be described herein, because the eighth preferred embodiment thus arranged operates and takes effect similarly as described in the seventh and eighth preferred embodiments.

Tenth Preferred Embodiment

A tenth preferred embodiment of an internal combustion engine with a water-cooling intercooler according to this invention is a further modification of the first preferred embodiment. The modification has been made for the purpose of reducing the cooling water leakage amount from the first fluid circuit for cooling the engine 1 to the second fluid circuit for cooling the intercooler 7 when the temperatures of the first fluid circuit are higher than those of the second fluid circuit.

Figure 12:
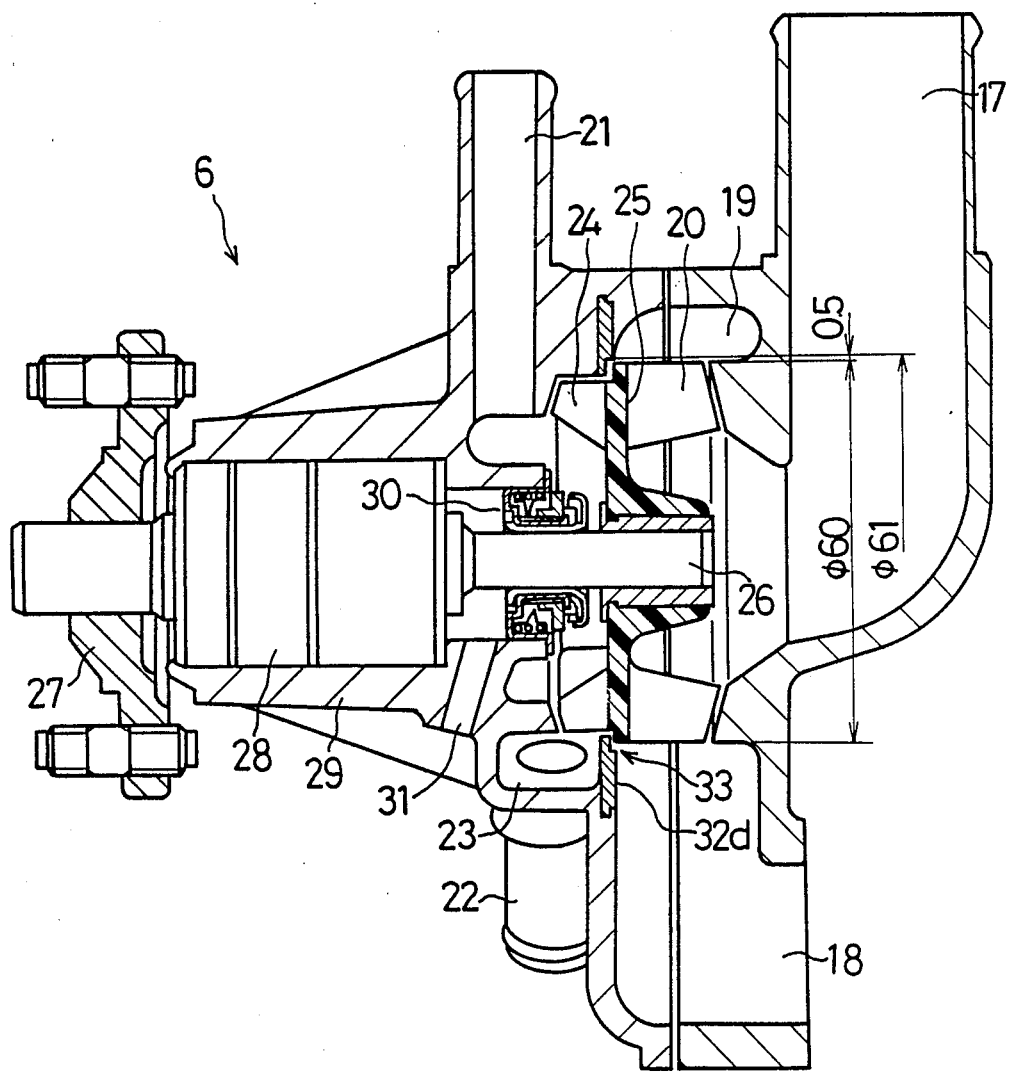
FIG. 12 is an enlarged cross-sectional view on a water pump of a tenth preferred embodiment of an internal combustion engine with a water-cooling intercooler according to this invention.
Figure 13:
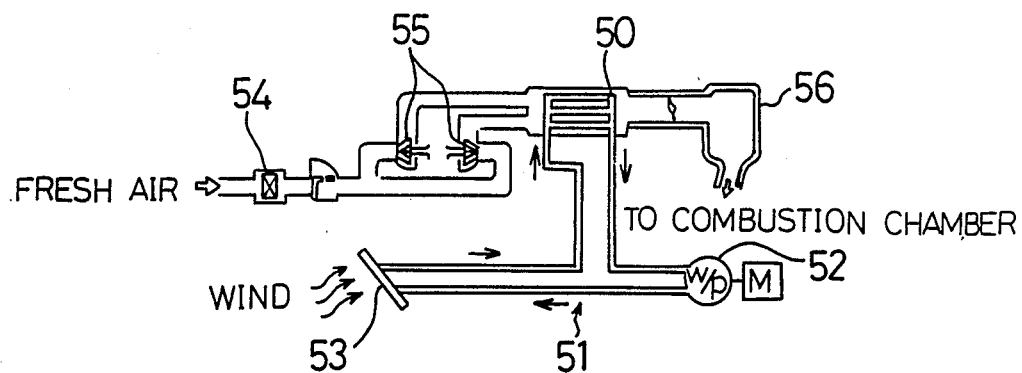
FIG. 13 is a fluid circuit diagram on a prior art internal combustion engine with a water-cooling intercooler.
Figure 14:
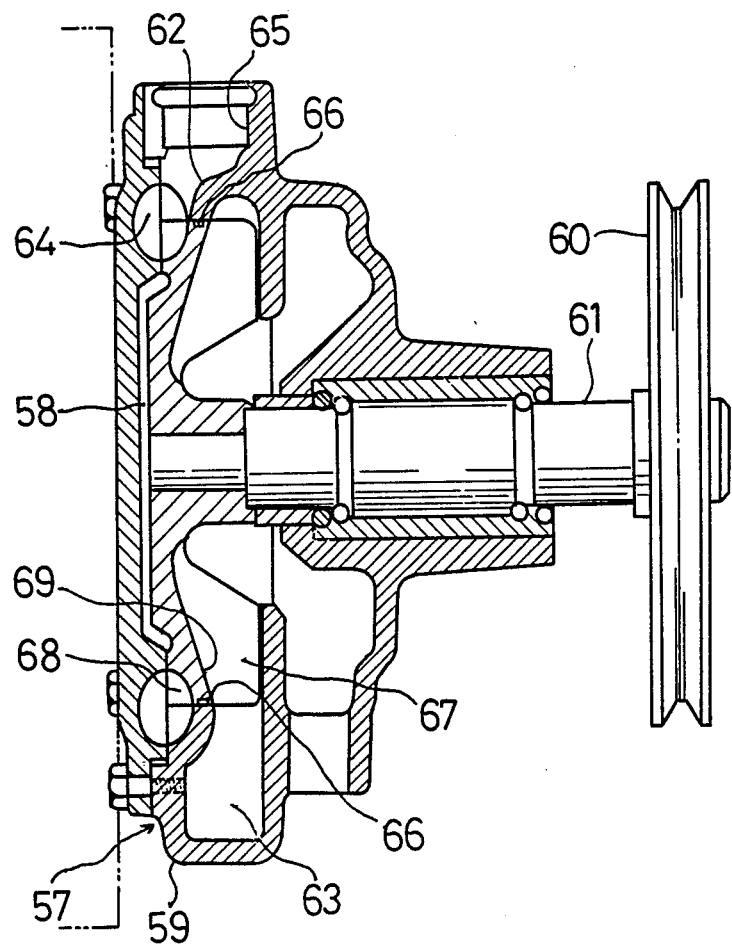
FIG. 14 is an enlarged cross-sectional view on a water pump of a prior art engine cooling apparatus.

FIG. 12 illustrates the tenth preferred embodiment. The tenth preferred embodiment differs from the first preferred embodiment with respect to the following: a partition plate 32d is made of a material different from the material for forming the other part of a body 29, and the thermal expansion coefficient of the material for forming the partition plate 32d is set smaller than that of the material for forming the rotary impeller 25. Also in this preferred embodiment, the partition plate 32d constitutes part of the body 29 adjacent to the rotary impeller 25, and forms a labyrinth portion 33 together with the rotary impeller 25.

For instance, the partition plate 32d is made of stainless steel (hereinafter referred to as SUS in accordance with Japanese Industrial Standards), and the rotary impeller 25 is made of polypropylene resin filled with glass by 7% (hereinafter referred to as PPG7). The thermal expansion coefficients of the SUS and the PPG7 are as follows:

SUS: $1 \times 10°$ C.$^{-1}$
PPG7: $5 \times 10°$ C.$^{-1}$

In the tenth preferred embodiment, the diameter of the rotary impeller 25 is set to 0 60 mm, the diameter of the partition plate 32d is set to o 61 mm at the temperature of 20° C., and the clearance on one side is thus set to 0.5 mm as illustrated in FIG. 12. Therefore, when the temperature of the cooling water reaches 100° C., the diameter of the rotary impeller 25 becomes 60.24 mm, and the diameter of the partition plate 32d becomes 61.05 mm, and the clearance on one side thus becomes 0.4 mm. The clearance is accordingly reduced by 20%, thereby reducing the cooling water leakage amount from the first fluid circuit to the second fluid circuit.

This tenth preferred embodiment operates in a similar manner as the first preferred embodiment. Namely, the cooling water of the first fluid circuit flows from a first water inlet port 17 to a first water outlet port 18, and the cooling water of the second fluid circuit flows from a second water inlet port 22 to a second water outlet port 21. Here, part of the cooling water flowing in the first fluid circuit is leaked through the clearance of the labyrinth portion 33 to the second fluid. In addition, the cooling water leakage amount is controlled by the cooling water temperatures at the first fluid circuit for cooling the engine 1. Specifically speaking, when the cooling water temperatures of the first fluid circuit for cooling the engine 1 are low, the clearance of the labyrinth portion 33 is set large, thereby allowing a large cooling water leakage amount. On the contrary, when the cooling water temperatures of the first fluid circuit are high, the diameter of the rotary impeller 25 increases to reduce the clearance of the labyrinth 33, thereby reducing the cooling water leakage amount. It is a matter of course that the rotary impeller 25 and the partition plate 32d are so designed that they are free from contact at the maximum cooling water temperature.

Having now fully described the invention, it will be apparent to one of ordinary skill in the art that many changes and modifications can be made thereto without departing from the spirit or scope of the invention as set forth herein.

What is claimed is:

1. An internal combustion engine with a water-cooling intercooler comprising:
   a first fluid circuit comprising: a radiator for cooling an engine; a first bypass conduit; and a first thermostat;
   a second fluid circuit comprising: a sub-radiator for cooling a water-cooling intercooler; a second bypass conduit; and a second thermostat; and
   a water pump comprising: a drive shaft driven by said engine and a rotary impeller fixed at an end of said drive shaft and comprising first vanes for delivering fluid in said first fluid circuit and second vanes of capacity smaller than the capacity of said first vanes for delivering fluid in said second fluid circuit;
   wherein said water pump has a clearance of labyrinth structure between said rotary impeller and a partition plate disposed around outer periphery of said rotary impeller and dividing a water pump body into a first volute chamber for delivering fluid in said first fluid circuit and a second volute chamber for delivering fluid in said second fluid circuit.

2. The internal combustion engine with the water-cooling intercooler according to claim 1, wherein said partition plate dividing said first volute chamber and second volute chamber further comprising at least one communication bore.

3. The internal combustion engine with the water-cooling intercooler according to claim 2, wherein said partition plate further comprising at least one thermo-sensitive member detecting the temperature of fluid on said first fluid circuit side for opening and closing said communication bore.

4. The internal combustion engine with the water-cooling intercooler according to claim 1 further comprising a communication conduit for communicating a conduit connecting an engine outlet port of said first fluid circuit with a radiator inlet port of said first fluid circuit and a conduit connecting a water pump outlet port of said second fluid circuit with an intercooler inlet port of said second fluid circuit; and said communication conduit comprising a flow control means.

5. The internal combustion engine with the water-cooling intercooler according to claim 4, wherein said flow control means is an orifice.

6. The internal combustion engine with the water-cooling intercooler according to claim 4, wherein said flow control means is a thermo-sensitive member detecting the temperature of fluid for opening and closing said communication conduit.

7. The internal combustion engine with the water-cooling intercooler according to claim 4, wherein said flow control means is an opening-closing valve for opening and closing said communication conduit in accordance with signals output by a fluid temperature sensor for detecting the temperature of fluid on said second fluid circuit side.

8. The internal combustion engine with the water-cooling intercooler according to claim 1, wherein at least said partition plate is made of a material having a thermal conductivity coefficient lower than the thermal conductivity coefficient of aluminum and being less likely to corrode, and said rotary impeller is made of a material less likely to corrode.

9. The internal combustion engine with the water-cooling intercooler according to claim 1, wherein only part of said partition plate forming said labyrinth structure is made of a material having a thermal conductivity coefficient lower than the thermal conductivity coefficient of aluminum and being less likely to corrode, and said rotary impeller is made of a material less likely to corrode.

10. The internal combustion engine with the water-cooling intercooler according to claim 1, wherein the thermal expansion coefficient of a material for forming said rotary impeller is greater than the thermal expansion coefficient of a material for forming said partition plate.

* * * * *